June 11, 1968 P. J. ISAACS 3,388,241
DIGITAL INTEGRATOR
Filed Sept. 15, 1965 2 Sheets-Sheet 1

INVENTOR
PeTer. J. Isaacs
BY
ATTORNEY
AGENT

June 11, 1968  P. J. ISAACS  3,388,241
DIGITAL INTEGRATOR
Filed Sept. 15, 1965  2 Sheets-Sheet 2

INVENTOR
PeTer J Isaacs
BY
ATTORNEY
H R Booker
AGENT

United States Patent Office 3,388,241
Patented June 11, 1968

3,388,241
DIGITAL INTEGRATOR
Peter J. Isaacs, New Hyde Park, N.Y., assignor, by mesne assignments, to the United States of America as represented by the Secretary of the Navy
Filed Sept. 15, 1965, Ser. No. 487,640
11 Claims. (Cl. 235—168)

ABSTRACT OF THE DISCLOSURE

A digital integrator for performing digitally the iterative solution of a correlation equation. Digital signals are read into a shift register and are sequentially smoothed through subtractor, adder and multiplication networks with timed feedback arrangements providing additional input signals necessary for the appropriate arithmetic operations.

This invention relates generally to a digital integrating system for filtering electrical signals and more particularly to a digital integrator for giving an iterative solution to a correlation equation.

Systems utilizing electrical signals to transmit information are inherently subject to noise arising from the transmission components and other sources. In order to extract the information from its surrounding noise background, it is necessary to introduce a filter which enhances information components of the signal in relation to the noise components of the signal. Where the information signals are relatively invariant in relation to the noise signals, or where the information signals have an upper frequency limit, a low pass filter is used to degenerate the noise relative to the information signals. However, the low pass filter must of necessity also attenuate the information signals to some extent. Where precise values of the information signals are required to be measured or transmitted, the attenuation introduced by the low pass filter brings an additional uncertainty into the measurement of the transmitted signal, thereby limiting the precision of the measurement.

In the past several systems for cross-correlating signal data have been developed where the outputs of the systems are noisy correlograms from which the true correlation function descriptive of the data is extracted. One such system specifically relating to the present invention is described in the May 1959 issue of the Proceedings of the I.R.E. on pp. 910 to 920 entitled, "Naval Ordnance and Electronics Research," by W. W. Scanlon and G. Lieberman. The correlogram of this system is a cyclically regenerated function which is averaged or smoothed by successively super-imposing a fraction of the amplitude of the function on a previously accumulated mean amplitude of the function. As indicated in this article, the prior approach to the smoothing problem involved an analog technique for performing the successive superpositions. This method consists of rotating a drum with a dielectric surface in synchronism with the cyclically applied correlogram signals and utilizing said signals to control the amount of charge deposited on the drum. The amount of charge deposited at any point on the drum in any correlogram cycle is proportional to a predetermined fraction of the difference between the present charge at that point and the instantaneous correlogram signal level.

While the dielectric recording technique has been very successful it has two major disadvantages which are the contamination of the dielectric surface and lack of exact control of the integration time. The latter disadvantage arised from the fact that the dielectric forms parts of the capacitance in the effective low pass filter presented to the correlogram signals. Since it is extremely difficult to maintain this capacitance constant over a long period of time, the filter time constant will vary, making it difficult to control the exact time at which peaks in the smooth correlogram appear. Also in systems where the information must be precisely transmitted or operated upon, it is conventional practice to convert the information signals into digital quantities which are less subject to alteration during the transmission process; therefore, the use of analog filtering techniques to enhance the information content of the signal relative to the noise content tends to defeat the purpose of a digital transmission system.

The general purpose of this invention is to provide a digital smoothing circuit which embraces all the advantages of similarly employed digital to analog devices and possesses none of the aforedescribed disadvantages. To attain this the present invention contemplates a digital smoothing system which performs the function of the dielectric recorder digitally. This function may be expressed as the iterative solution of the equation:

(1) $\overline{g_n(t)} = \overline{g_{n-1}(t)} + u[\overline{g_n(t)} - \overline{g_{n-1}(t)}]$ where the overscored terms denote average values, the subscripts denote the period in which a correlogram input values have been obtained, and the quantity ($u$) represents the attenuation factor associated with the dielectric recorder.

It is an object of the present invention to provide a reliable and relatively simple digital filter means for averaging digital information.

Another object of the invention is the provision of digital means for enhancing the signal-to-noise ratio of information in digital form.

A further object of the invention is to provide smoothing means having precise timing of the digital smoothing operation so that the internally circulating weighted smooth information and the output smoothed information are compatible in time, respectively, with the operation of the smoothing means itself and the rest of a digital transmission system.

A further object of this invention is to provide a digital integrator which permits the selection of the integration time, and makes integration possible over a longer time than is readily feasible in analog integration systems.

These and other objects and features of the invention will become apparent to those skilled in the art as reference is now made to the following description taken in connection with the accompanying drawings in which.

It is well known that the correlation function between two time varying functions is defined by the expression:

(2) $g(t) = \lim_{A \to \infty} \frac{1}{2A} \int_{-A}^{A} f(T)f(T-t)dT$ where A is one of several delay taps of a delay line, not shown, $f(T)$ and $g(t)$ are variable functions of time, and ($t$) is the time displacement between the two variables. Correlogram signals mentioned above are obtained from a digital-to-analog conversion of digital signals representing computed values of this correlation function. The cyclically generated correlogram represents periodic acquisitions of the function $f(T)$ in conjunction with repeated computations of the product $f(T)f(T-t)$ over the full range of values of the variable T, and summation of said products for each possible value of the argument ($t$). To perform the equivalent function digitally, the function is expressed as the iterative solution of Equation 1 where $\overline{g_n(t)}$ is the new smoothed signal for time period $n$, $\overline{g_{n-1}(t)}$ is the smoother or averaged signal of the time period just preceding $\overline{g_n(t)}$, $g_n(t)$ is the unsmoothed digital signal input, and $(u)$ is the appropriate attenuation factor. Thus the digital computation of the smooth values involves at least an addition, a subtraction, and a multiplication.

Figure 1:
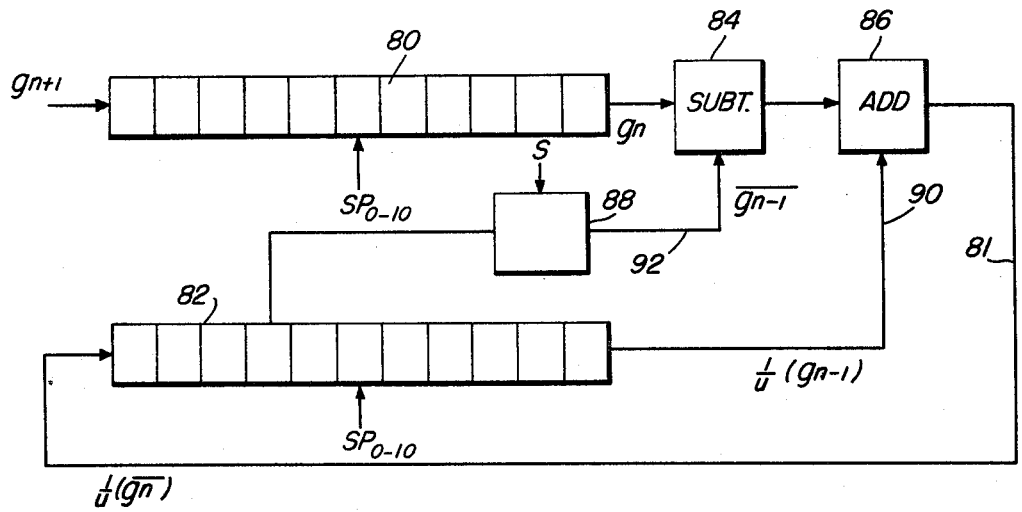
FIG. 1 shows a block diagram of the basic components used in digitally solving a correlation function.

FIG. 1 illustrates two 11-stage shift registers 80 and 82 acting as translation devices to input signal $g_{n+1}$ and feedback signal $1/ug_n$ respectively. The shift registers are synchronously stepped or shifted by shift pulses SP which are periodic and cyclically grouped in groups of 11 pulses which are designated by subscripts 0 through 10. The data to be smoothed consists of 11 digit binary words propagated through shift register 80 without any intervening dead space or vacant digit intervals; thus, for the $n$th data word $g_n$, and the following data word $g_{n+1}$, the last (most significant) digit of $g_n$ will be immediately followed by the first or least significant digit of $g_{n+1}$. The sequence of data entry into shift register 80 is such that information shifted into subtractor 84 occurs with the least significant data digit entered in coincidence with $SP_0$ and the most significant data digit is entered in coincidence with $SP_{10}$.

A second signal $\overline{g_{n-1}}$ is supplied over lead 92 to subtractor 84 where it is subtracted from the input signal $g_n$ to provide a signal to addition circuit 86. Shift register 82 supplies signal $\overline{g_{n-1}}$ through a gating device 88 from a predetermined register stage and also supplies the same signal multiplied by a factor $1/u$ over lead 90 to the addition circuit 86. The output of the subtractor 84 is combined with the output of the last stage of shift register 82 in adder 86 with the resulting signal fed back to the input stage of shift register 82 over lead 81.

Figure 2:
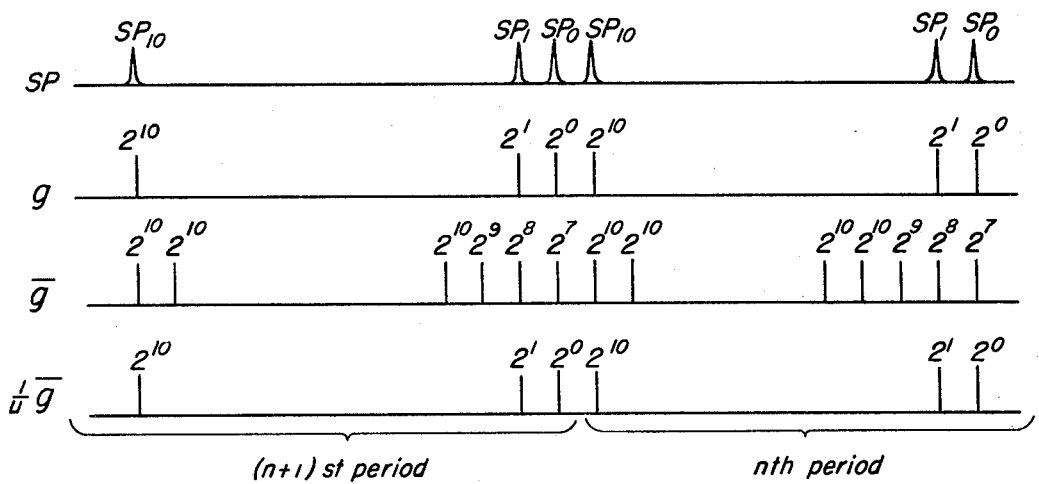
FIG. 2 shows the pulse period relationships of the signals in FIG. 1.

FIG. 2 shows the relative character and timing of the signals entering subtractor 84 and adder 86 which show a number of relative waveform timing diagrams SP, $g$, $\overline{g}$ and $\overline{1/u(g)}$. The SP diagram is a reference timing diagram illustrating the order of occurrence of the shift pulses SP and the $g$ diagram illustrates the propagation of the digits of successive data words, $g_n$ and $g_{n+1}$, into subtractor 84 under the control of the corresponding shift pulses SP. The $\overline{g}$ diagram illustrates the signals emerging on conductor 92 in FIG. 1 while the $\overline{1/u(g)}$ timing diagram shows the second sequence, the signal sequence at the output of shift register 82. In the $g$, $\overline{g}$, and $\overline{1/u(g)}$ timing diagrams, each digit period is identified by the power of 2 corresponding to the digit order. The corresponding digit intervals in the $g$ and $\overline{1/u(g)}$ timing diagrams represent identical digit orders, but the $\overline{g}$ timing diagram is different in that the digit propagating coincidence with the first digits in the other two diagrams is the 8th digit order of the unshifted number, and the 11th digit is repeated seven times. The repetition of the 11th digit does not affect the numerical value of the information as will be explained below, but in effect, the information in the $\overline{g}$ timing diagram has been multiplied by $2^{-7}$ relative to the information in the $g$ and $\overline{1/u(g)}$ timing diagrams.

In the conventional binary representation for encoded signals representing positive and negative signal levels, it is customary to include a sign digit which is usually transmitted as the most significant digit of the encoded number. Arbitrarily selecting a binary zero sign digit to represent positive information and binary one sign digit to represent negative information the repetitive generation of the sign digit (the most significant digit) does not affect the numerical value of the number in question. For example, one may consider the binary representation of the decimal number $+6$. In binary notation, this is the number 0110, where the zero may be conveniently used to designate the plus sign. In a system where each word is eleven digits in length, the number $+6$ may be written as 00000000110, where the first digit to the left represents the sign digit. Similarly, the number $-6$ in an eleven digit system may be written as 11111111010, where the first digit to the left is representative of a negative sign. The only difference between the representation for the numbers $+6$ or $-6$ in an eleven digit and a four digit system involves the repetition of the sign digit in the additional digit orders. Therefore, it can be seen that the repetition of the sign digit does not affect the numerical value.

The information signals $g_{n+1}$ applied to the shift register 80 comprise groups of signals wherein each group represents a number N, for example, 2 in FIG. 2, and the subscripts denote the time of occurrence of the signals representing the digits in corresponding digit orders of the number 2. The digit signals in corresponding order occur at the same time, but signals $\overline{g_{n-1}}$ on lead 92 are seven stages removed from the last stage of register 82. The first four signals emerging on lead 92 will be the 7th, 8th, 9th and 10th digit orders of the binary number N, corresponding to the coefficients of the corresponding powers of 2, namely $2^7$, $2^8$, $2^9$, $2^{10}$, whereas the times of occurrence of these signals coincide with the times of occurrence of the signals representing the digit orders corresponding to the coefficients of $2^0$, $2^1$, $2^2$ and $2^3$ of the number N.

The shift pulses SP cause the stepping of the information signals through the registers designated by subscripts corresponding to the digit order of a number N which each pulse will transfer onto leads 90 and 91. Shift register 82 provides the necessary delay for the factor $(u)$ in the iterative computation of Equation 1. The attenuation factor $(u)$ essentially determines the value of N and the associated filter cut-off frequency which is $1/N$ times the filter cut-off frequency. In order to simplify the multiplication, $(u)$ is selected as a reciprocal of a power of 2.

With $g_n$ representing unsmoothed digit input information and $\overline{g_n}$ representing smoothed digital information and with the quantity $(u)$ chosen to be less than unity, a series of equations can be derived to illustrate the nature of the interative process performed by this system. First, regrouping Equation 1 for a more orderly grouping of terms gives (3) $\overline{g_n}=(u)g_n+(1-u)\overline{g_{n-1}}$; then (4) $\overline{g_1}=(u)g_1$ over the first smoothed data value; then (5) $\overline{g_2}=(u)g_2+u(1-u)g_1$ represents the expression for the second smooth value from which it follows that (6)

$$\overline{g_n}=(u)g_n+u(1-u)g_{n-1}+ \ldots \\ u(1-u)^{n-2}g_2+u(1-u)^{n-1}g_1$$

represents the generalized expression for the $n$th smooth value.

Considering the signal $g_n$ as a composite of signal and noise covering a wide frequency spectrum, a number of assumptions regarding the signal values $g_j$ may be made. One assumption is $g_j=K+X_j$ (7) wherein it is assumed that each signal $g_j$, for all $j \leq n$, consists of a sampled D.C. component K, plus a sampled variable component $X_j$. If the signal values $g_j$ are accumulated at a high enough rate, the quantity K will constitute the intelligence level of the signal, while the quantities $X_j$ will represent the noise variations in the signal.

Substituting the expression for $g_j$ into Equation 6, a new expression for the smooth value $\overline{g_n}$ is obtained:

(8) $\overline{g_n}=uK[1+(1-u)+ \ldots (1-u)^{n-1}]$
$+u[X_n+(1-u)X_{n-1}+ \ldots (1-u)^{n-1}X_1] \cong K$
$+u[X_n+(1-u)X_{n-1}+ \ldots (1-u)^{n-1}X_1]$ For large enough $(n)$, it can be shown that the expression so obtained approaches the value indicated in Equation 8, said value representing the summation of the unattenuated intelligence signal level K and the weighted sum of the noise variations, with a geometric progression of decreasing weights assigned to the noise variations in the order of increasing age. If the noise is truly random, the smooth signal value will approach the quantity K. With the quantity K representing the composite signal level due to frequency components less than $1/n$ times the sampling frequency, the digital device acts an a low-pass filter which passes frequencies lower than the sampling frequency. The attenuation factor $(u)$ determined the rate of convergence of the first expiration in Equation 8 to the value K which essentially determined the value of N and the associated filter cut-off frequency $1/n$ times the sampling frequency.

The mathematical operation performed by the circuit of FIG. 1 is not exactly that defined by Equation 1 above, however; it differs mathematically from the above operation only in that Equation 1 has been divided on both sides by the factor $(u)$. This is done to give a physical advantage since no space need be provided between successive data words and the entire operation can be accomplished with a single multiplication.

Figure 3:
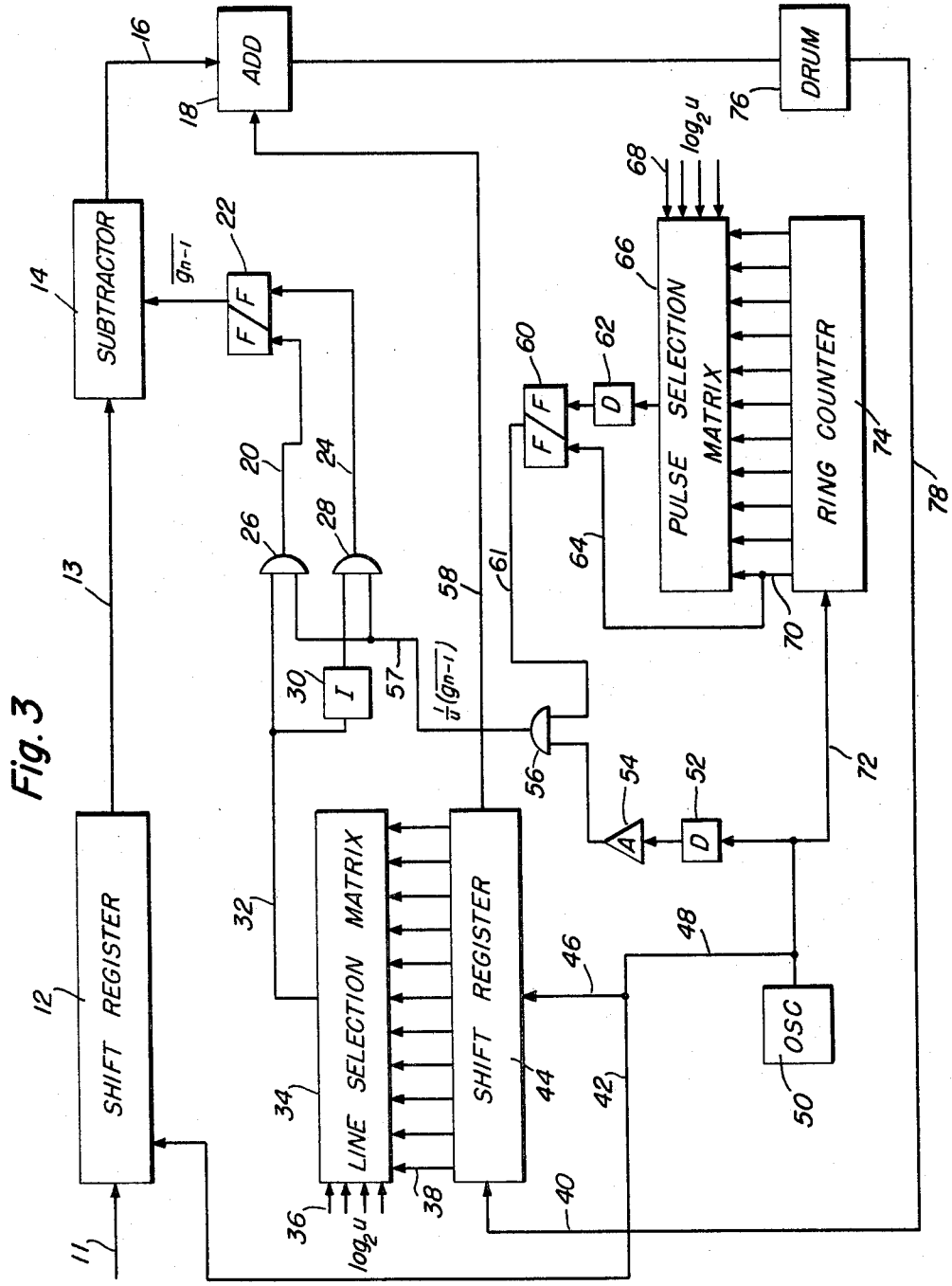
FIG. 3 illustrates one embodiment of the digital integrator system.

FIG. 3 is a detailed illustration of the digital integrator in which shift register 12 receives digital information over lead 11 and supplies input signal $g_n$ over lead 13 to subtractor 14 as it is stepped by pulses on lead 42 from oscillator 50. The shift pulses are supplied from oscillator 50 over leads 42 and 46 to shift registers 12 and 44 and are also supplied over lead 72 to ring counter 74. Ring conuter 74 is conventional consisting of a plurality of cascaded bistable stages all having identical stable states, with the exception of one of the stages which is in a state opposite to that of the other so that a signal applied to the counter causes the opposite state to advance successively through each of the cascading stages; then when the signal is transferred from the last stage, it is fed back to the first stage to complete the ring.

The timing is so arranged that a shift pulse $SP_0$ causes the completion of the transfer of the last digit of a data word into shift register 44. The $2^0$ bit representing the coefficient of the data word will then appear at the outputs of the last stages of the registers 12 and 44 while at the same time the output of a selected one of the stages, for example the 8th stage, of the shift register 44 corresponds to a particular digit (8th) of the word stored in the register. Each stage has associated output conductors 38 which transfer signals of proper amplitude when the particular stage is selected by a conventional line selection matrix 34. The particular selection matrix which may be utilized herein forms no part of this invention and may be designed by one of ordinary skill in the art in accordance with well-known circuit design techniques, an example of which is shown by Montgomery Phister, Jr. in a textbook entitled Logical Design of Digital Computers published by John Wiley & Sons in 1958 at pp. 182–83 with reference to FIGURE 7–2. The signal stored in ring counter 74 as the ring counter is successively stepped through the cascaded stages will be distributed so that when $SP_0$ occurs a signal will be received on conductor 70 and condition flip-flop device 60 into the binary 1 state. When flip-flop 60 is conditioned to the 1 state the output signal level on conductor 61 conditions AND gate 56 to transfer the signals incident upon its other input terminal over the lead containing delay element 52 and amplifier 54 to lead 57. The signals incident upon the input to AND gate 56 are obtained by delaying and regeneratively amplifying the shift pulses through delay element 52 and amplifier 54, the delay of the delay element being less than or equal to one-half of the period between shift pulses. Pulses appearing at the output of AND gate 56 condition AND gates 26 and 28 over lead 57 to transfer signals present from line selection matrix 34 over leads 20 and 24 to flip-flop device 22, wherein an average signal $\overline{g_{m-1}}$ is supplied to the subtractor unit 14.

If the 8th stage is selected as the stage to derive an output from shift register 44, the fourth pulse received as a signal progresses through ring counter 74, causes an output to appear at a corresponding output conductor of the ring counter which is applied to delay element 62 having a delay greater than that of delay element 52, but less than a shift pulse period. The output of delay element 62 conditions flip-flop 60 into its other stable stage resulting in the inhibition of signals propagating through AND gate 56. For the example given above, four delay pulses $SR_0$ through $SR_3$ pass through AND gate 56 and transfer the instantaneous content of the eighth stage of shift register 44 to flip-flop 22. Accordingly, flip-flop 22 stores the last signal received, said signal representing the digit that has been stored in the eleventh stage of shift register 44 after the occurrence of $SP_0$, until AND gate 56 is again conditioned to pass signals. Effectively, therefore, the sign digit of the number stored in shift register 44 is repeated for seven shift pulse periods following the occurrence of shift pulse $SP_3$, and the output of flip-flop 22 represents $2^{-7}$ times the number stored in shift register 44 at the time of occurrence of $SP_0$.

A single output conductor 32 may be utilized to transfer the information from the selected stage of shift register 44 to the flip-flop 22 by inverting the signal appearing on conductor 32 through an inverting circuit 30 and applying the inverted signal to the AND gate 28. The inverter may be omitted and an individual line may connect each stable state output of a selected stage of shift register 44 to AND gates 26 and 28.

FIG. 3 illustrates the technique used to obtain a variable weighting factor $(u)$ which, for example, was obtained by introducing a fixed multiplication by the constant $2^{-7}$, said multiplication consisting of the extraction of signals from the eighth stage of shift register 44 in conjunction with the first four shift pulses. Each of the stages of shift register 44 has an associated output conductor 38 which is applied to a line selection matrix 34 having control inputs 36 which select one of the output conductors and connect it to conductor 32. Such selection matrices are conventional devices and may be mechanized, for instance, by means of relays or other devices in the manner taught in Keister, Richtie, and Washburn, The Design of Switching Circuits, p. 310, FIGURES 13–5 and 13–6. To apply such a conventional selection matrix as shown therein to the particular digital integrator of the invention, there can be 4 stages, each having only two input relays $A_0$, $A_1$; $B_0$, $B_1$; etc. wherein $A_0$, $B_0$, etc. could represent binary zeros and $A_1$, $B_1$; etc. can represent binary ones. Each predetermined output leads $A_0$, $B_0$, etc. can then be used to represent digits corresponding to particular output stages of the shift register 44 and ring counter 74. Simple relay switches or other means can be used to connect the appropriate shift register output stage selected to the matrix output lead 32.

Selection through matrix 34 and matrix 66 is made by applying a binary signal combination representative of the $\log_2^{(u)}$ to appropriate input control terminals 36 and 68. For example, if the seventh conductor to the left of the extreme right-hand conductor that is, the 8th stage as discussed above is connected to conductor 32, the control signal combination will be 0111 on the conductors 36 and 68, the combination of signals representing the binary equivalent of the decimal number 7, which is $\log_2^{(u)}$. Thus, if the control signals on conductors 36 and 68 represent binary 7, the output of the matrices 34 and 66 will consist of the shift pulse $SP_3$ from the 8th stages of the shift register 44 and ring counter 74. Variable selection of the weighting factor $(u)$ and proper repetition of the sign digit from the resultant intermediate shift register stage output are obtained therefore by variation of the signals representing $\log_2^{(u)}$.

The delayed smoothed signal $\overline{g_{n-1}}$ is subtracted in subtractor 14 from digital input signal $g_n$ providing an output on leads 16 to adder 18. Adder 18 combines the signal on lead 16 with incoming signal from the last stage of shift register 44 over lead 58 which is the average delayed signal multiplied by a factor of $1/u$. Adder 18 output is recirculated over lead 78 back to the input of shift register 44 where the process is repeated for all values on N.

This invention is applicable to the iterative smoothing process required to smooth the correlation function output of a Deltic correlator of the type considered in the I.R.E. article previously referenced. In order to accomplish the smoothing process for all of the values of the argument ($t$), a multiplexing device has been incorporated in the present system. In FIG. 3, each output word from the adding device 18 is applied to the write head of a magnetic drum 76, which is synchronously rotated so to produce a predetermined delay in the transfer of signals from the write head to a read head associated with magnetic drum 76. The output of the read head is then applied to shift register 44 reaching the output thereof in synchronism with the unsmoothed value of the new data corresponding to the same argument ($t$), wherein said new data emerges from shift register 12 thus giving an effective weighted superposition of corresponding data words in arithmetic units 14 and 18.

From the foregoing it can be seen that a novel system has been developed for digitally filtering electrical signals. The invention provides an iterative solution for a correlation function previously solved by analog techniques. The invention is a reliable and relatively simple digital means for integrating digital information which enhances the signal-to-noise ratio of information in digital form, which is compatible with correlation systems of a Deltic type, which permits variable selection of integration time, and makes integration possible over long periods of time.

Obviously many modifications and variations of the present invention are possible in the light of the above teachings. It is therefore to be understood, that within the scope of the appended claims, the invention may be practiced otherwise than as specifically described.

What is claimed is:

1. A digital filter circuit for filtering a smooth correlogram data signal from a noisy correlogram data signal comprising,
   means for delaying and recirculating integrated digital signals,
   means for subtracting integrated digital signals of the time period just preceding that of incoming digital data signals from said incoming signals, having a difference signal output and having an input connected to said delay means,
   multiplier means connected to said delay means multiplying recirculated delayed digital signals by a signal representing a predetermined constant, having an integrated, delayed multiplied digital output signal therefrom, and
   means connected between said substracting means and said multiplier means for adding said difference signal to said integrated delayed multiplied digital signal providing a new integrated digital data signal for recirculation.

2. The apparatus of claim 1 further comprising a matrix device for selecting a signal representative of a multiplication constant to be multiplied by said integrated delayed digital signal.

3. The apparatus of claim 1 further comprising timing control means including an oscillator and a counter, said oscillator supplying timing pulses to said delay and recirculating means in synchronism with said counter.

4. The apparatus of claim 3 further comprising a first selection matrix connected to said delay and recirculating means and a second selection matrix connected to said counter, said matrices synchronously operated to select a predetermined pulse output from said counter and a delayed integrated digital output from said delay and recirculating means when a predetermined time period has elapsed.

5. A digital integrator for averaging a correlogram mathematical function by iterative procedures comprising,
   first shift register means, having a plurality of stages, supplying unsmoothed digital input signals representing a correlogram function,
   second shift register means having a plurality of stages with output terminals connected to a preselected intermediate one of said stages and the last of said stages,
   an arithmetic unit including subtracting means and adding means for performing subtraction and addition operations on digital input signals, the output of said adding means connected to the input of said second shift register means, and
   control means for synchronizing the stepping of the shift registers between stages and for delaying a smooth digital output from said intermediate stage a predetermined period of time,
   said intermediate stage output providing an averaged digital signal delayed a predetermined period of time to said subtractor means, said last stage providing a delayed digital signal multiplied by a constant to said adding means, said arithmetic means subtracting the delayed digital signal from the unsmoothed input signal and adding the difference to the multiplied signal to provide an accumulated averaged signal at the output thereof which is regenerated to the input of said second shift register.

6. The apparatus of claim 5 wherein said control means includes an oscillator, a ring counter, and a gating circuit, said oscillator synchronously supplying shift pulses to the first and second shift registers and to said ring counter and control pulses to said gating circuit,
   said gating circuit connected between the output terminal of the intermediate stage of said second shift register and said ring counter, conditioned by an output signal from said ring counter to pass an integrated delayed digital signal from said second shift register to said subtracting means after a predetermined number of shift pulses have moved said accumulated averaged signal to said intermediate stage.

7. The apparatus of claim 4 further comprising a line selecting matrix connected to the outputs of the stages of said second shift register, selecting a predetermined intermediate stage of said second shift register in accordance with a preselected binary signal representing mathematical function of said multiplication constant, whereby a variable multiplication factor may be selected.

8. The apparatus of claim 6 further comprising a line selection matrix connected to the outputs of the stages of said second shift register, and a pulse selection matrix connected to the output stages of said ring counter, said line matrix selecting an intermediate stage line output synchronously with a selected pulse output from said ring counter.

9. The apparatus of claim 8 wherein said gating circuit includes a first delay means connected to the output of said pulse selection matrix, a plurality of AND gates, a first bistable device connected between said first delay means and one of said AND gates, second delay means connected between said oscillator and said one of said AND gates, second bistable device having an output connected to the subtractor means, and at least another of said AND gates having input connections from said line selection matrix and said one of the AND gates.

10. A digital filter circuit for providing smoothed digital data signals from noisy digital data input signals comprising, in combination,
    a subtractor circuit having an input for said noisy digital data signals,
    an adding circuit having an output for said smoothed digital data sginals,
    means connecting said adding circuit output to said subtracting circuit for recirculating said smoothed digital signals, said recirculating means including a delay circuit for providing smoothed digital signals delayed a period of time equal to the period of one digital data signal, said recirculating means further including a multiplication circuit connected to said adder for multiplying said delayed smooth data signal by a predetermined constant, said subtractor circuit providing a difference signal between a noisy digital data input signal and said delayed signal, said adder combining the difference signal with the multiplied signals to give a smoothed digital data signal at its output.

11. The apparatus of claim 10 further comprising a matrix device for selecting a signal representative of a multiplication constant to be multiplied by said integrated delayed digital signal.

References Cited

UNITED STATES PATENTS

| | | | |
|---|---|---|---|
| 3,177,349 | 4/1965 | Zaborsky et al. | 235—152 |
| 3,182,181 | 5/1965 | Schumann | 235—164 |
| 3,201,705 | 8/1965 | Hanulec et al. | 328—165 |

MALCOLM A. MORRISON, *Primary Examiner.*

V. SIBER, *Assistant Examiner.*